Patented Nov. 2, 1926.

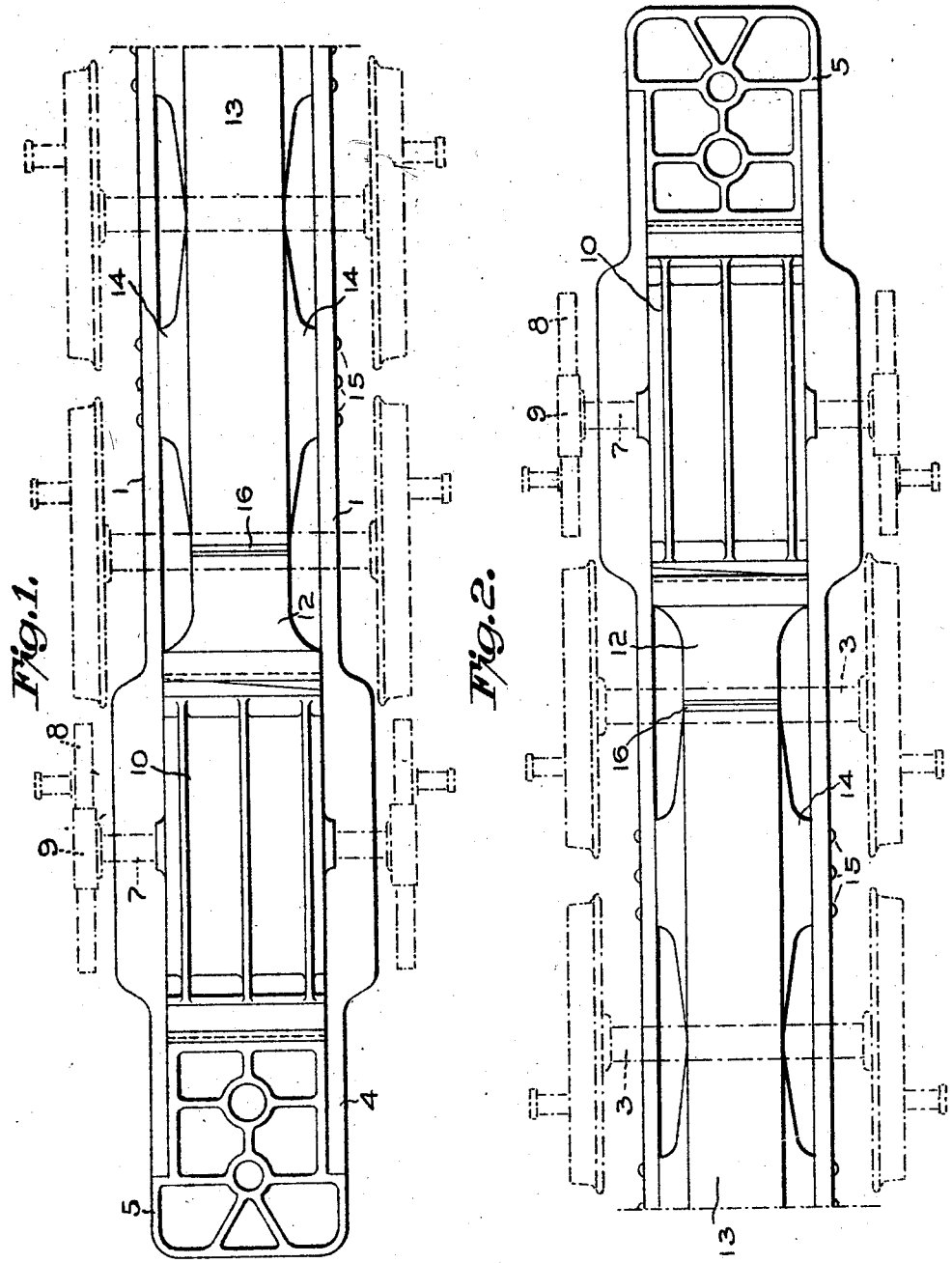

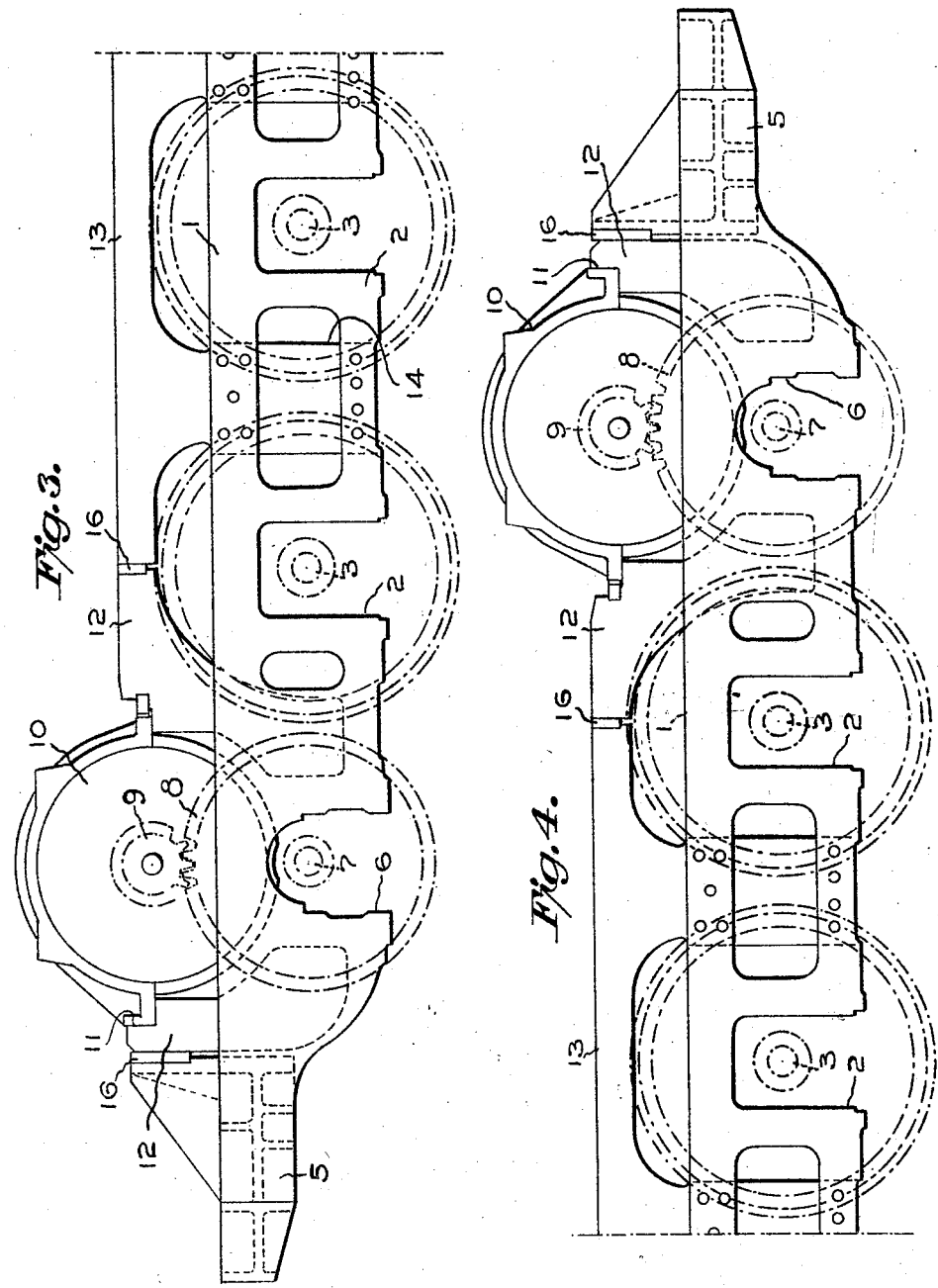

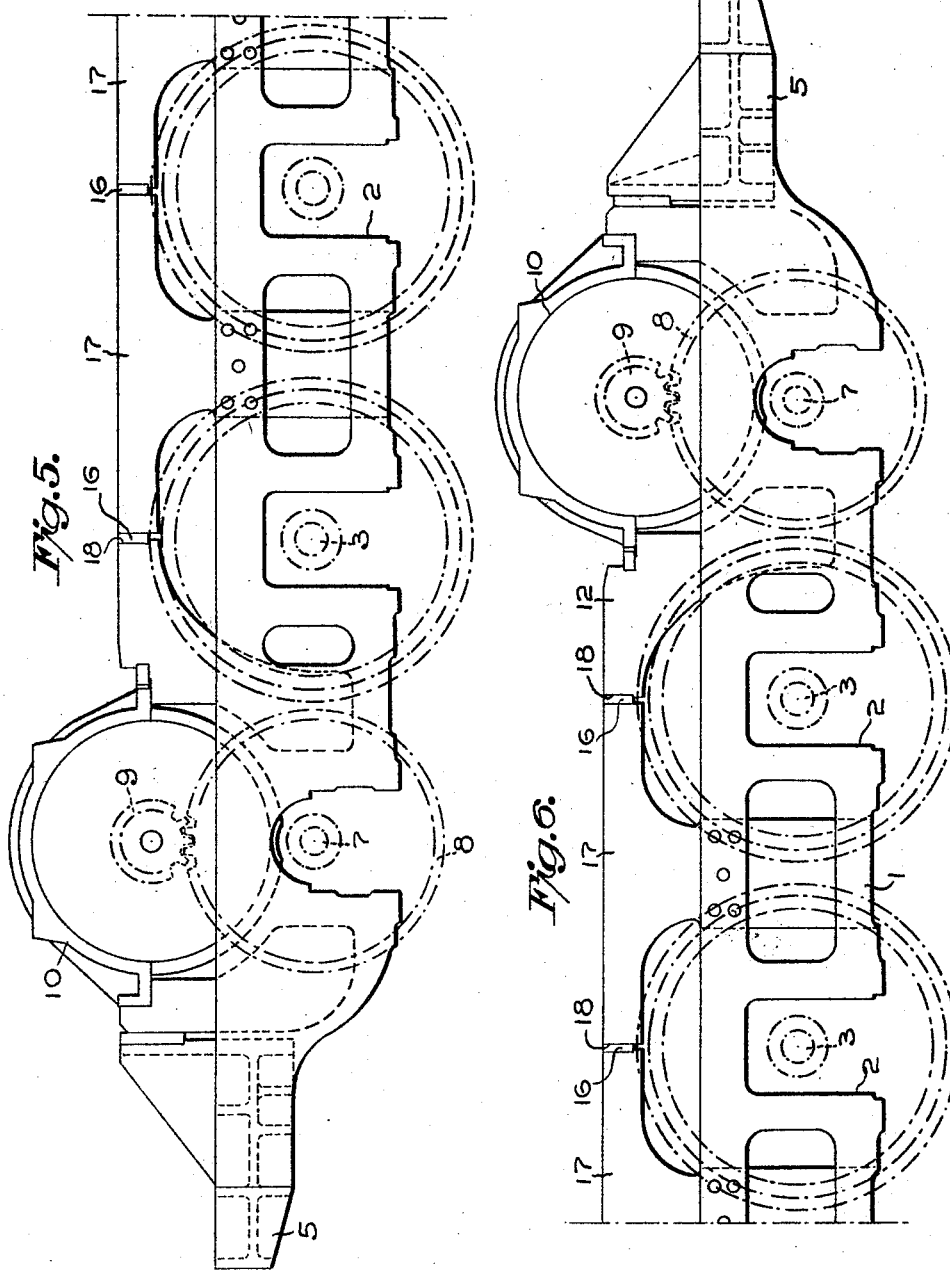

1,605,029

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

LOCOMOTIVE FRAME.

Application filed January 16, 1925. Serial No. 2,746.

My invention relates to railway vehicles, more particularly to the supporting frame structures of electrical locomotives.

It is among the objects of my invention to provide a wheeled frame construction for railway vehicles which shall be of simple, compact and durable mechanical construction and so designed as to provide exceptional rigidity for the main frames, in order to permit lifting the entire locomotive off the rails by engaging the end frames only.

Another object of my invention is to provide a railway vehicle frame structure which shall embody a reinforcing frame portion having the dual function of reinforcing the main frames and providing an equipment deck for the propelling mechanism and accessory control apparatus.

Another object of my invention is to provide a railway vehicle frame of the above-designated character which shall be so designed that the several parts of which the frame member is constituted may be readily produced and assembled in an expedient and efficient manner.

In prior types of railway vehicle frame structures, the frame portions in which the wheeled axles were journalled comprised essentially a pair of side or main frames having end sills or bumpers and suitable transverse reinforcements, which were secured to the main frames in a manner to provide lateral support and adequate rigidity in accordance with the stressing and loading of the frame members. There was no provision, however, for loading the wheeled frames with the propelling equipment and for this purpose a vehicle sub-frame was usually provided, which was engaged with the wheeled frame by means of movable center pin connections. The sub-frame supported the vehicle body and constituted the equipment deck or flooring on which the motors and controllers were mounted.

My present invention is directed to a vehicle frame construction having a frame portion disposed and secured over or between the main frames and extending longitudinally thereof. This frame portion constitutes the equipment deck and provides the necessary reinforcement for the side frames to facilitate handling the entire frame structure by lifting it at its ends, without fear of buckling or collapsing the frame portion. Another advantage of my invention is the possibility of designing this intermediate frame portion to obtain a far greater depth of frame than was permissible in the usual type of prior main frame construction. In accordance with my present invention, the side or main frames may be of standard depth and the intermediate frame portion so designed as to produce such an extending portion above the side frames as will provide any desired amount of vertical or transverse section of the structure above that which is inherent in the side frames alone.

This intermediate frame structure is further adapted to be manufactured and assembled in sections without sacrificing any of the above-enumerated advantages, thus facilitating manufacturing operations.

In the accompanying drawings constituting a part hereof and in which like reference characters designate like parts, Figure 1 is a plan view of the front half of a vehicle frame embodying the principles of my invention;

Fig. 2 is a similar view of the rear half of the frame member shown in Fig. 1, the frames of Figs. 1 and 2 when joined constituting the complete frame structure;

Fig. 3 is a view in side elevation of the frame structure shown in Fig. 1;

Fig. 4 is a similar view of the structure shown in Fig. 2;

Fig. 5 is a view in side elevation of a front portion of a vehicle frame showing a modified form of frame structure embodying my invention; and Fig. 6 is a similar view of the rear portion of the vehicle frame shown in Fig. 5.

Referring to Fig. 1 to Fig. 4, inclusive, the structure illustrated therein comprises a pair of side frames 1 that are provided with the usual pedestal windows 2 (Fig. 3), for receiving the journal boxes of driver wheel axles 3. The side frames 1 terminate in constricted portions 4, between which bumper frames 5 are mounted and secured. The front end portion of the side frames 1 and also the rear end portion thereof are provided with openings 6 that are adapted to receive the journals of jack shafts 7, which are operatively connected through gear-wheels 8 to pinions 9 of motors 10.

The motors 10 are mounted with their frames fitted into recessed portions 11 of the frame members or end sills 12, which may constitute an integral part of the side frames 1 or be bolted or otherwise secured thereto. A longitudinally extending frame portion 13 having lateral extensions 14 and constituting a "back-bone" member is disposed between the main frames, which are secured thereto by rivets or bolts 15. The reinforcing frame member 13 extends to the frame portions 12, but sufficient space is provided between the adjacent frame members to permit the insertion of wedges 16, Fig. 3. These wedges or filler blocks assist in providing a contiguous frame section throughout the length of the vehicle. The extending portions 14 of the frame 13 correspond in depth to the depth of the side frames 1, thus securely providing against vertical deflection.

In Figs. 5 and 6, I have illustrated the central frame portion 13 as comprising a plurality of sections 17 which are of such length as to provide spaces 18 therebetween for the purpose of receiving the filler blocks or wedges 16 to provide a contiguous section throughout the length of the vehicle. The object of constructing the frame in sections is to facilitate manufacturing operations, particularly the casting of the frame portions and the assembling thereof with respect to the side frames.

It is evident from the foregoing description of my invention that vehicle frames made in accordance therewith provide a very strong frame construction that is very rigid and capable of carrying heavy loads and, furthermore, the reinforcing frame members 13 provide an equipment deck, thereby eliminating the need of a separate sub-frame structure.

Although I have described two embodiments of my invention, it will be obvious to those skilled in the art that various further modifications may be made in the details of construction and the size, proportion and arrangement of the several cooperating parts, without departing from the principles herein set forth.

I claim as my invention:

1. In a railway vehicle, the combination with a wheeled truck frame, of a reinforcing frame having its main body portion extending longitudinally of and above the main frames, said reinforcing frame having a relatively deep frame section which is disposed between, and secured to, said main frames.

2. In a railway vehicle, the combination with a wheeled truck frame, of a reinforcing frame having its main body portion extending longitudinally of and above the main frames, said reinforcing frame having relatively deep body portions by which it is secured to said main frames.

3. In a railway vehicle, the combination with a wheeled truck comprising a pair of main frames, end sills, and bumper frames, of a reinforcing frame and equipment deck disposed between said main frames and secured thereto, said reinforcing frame having laterally projecting portions of relatively great depth by which it is secured to the main frames.

4. In a railway vehicle, the combination with a wheeled truck comprising a pair of main frames, end sills, and bumper frames, of a re-inforcing frame and equipment deck disposed between said main frames and having relatively deep lateral portions secured thereto, said reinforcing frame constituting a unitary structure for re-inforcing the truck frame and for carrying the equipment of the vehicle.

5. In a railway vehicle, the combination with a truck structure comprising the usual side frames journalled upon a plurality of wheeled axles, of a frame portion extending longitudinally of said side frames and having relatively deep lateral portions secured thereto, said frame portion constituting a tie rod for the side frames and an equipment deck for said vehicle.

6. In a railway vehicle, the combination with a truck structure comprising the usual side frames journalled upon a plurality of wheeled axles, of a frame portion comprising a plurality of sections, means for arranging and securing said sections between said frames and means disposed between said sections to thereby form a continuous longitudinal support.

7. In a railway vehicle, the combination with a truck structure comprising the usual side frames journalled upon a plurality of wheeled axles, of a frame portion comprising a plurality of sections disposed between and secured to said frames, and wedge blocks secured between said sections to constitute the same a contiguous body portion.

In testimony whereof, I have hereunto subscribed my name this 31st day of December 1924.

HAROLD A. HOUSTON.